(12) United States Patent
Florenz et al.

(10) Patent No.: US 10,101,190 B2
(45) Date of Patent: Oct. 16, 2018

(54) FIELD DEVICE ELECTRONICS FOR A CONDUCTIVE LIMIT-LEVEL SWITCH

(75) Inventors: Hans-Jörg Florenz, Uhldingen-Mühlhofen (DE); Clemens Helig, Ludwigshafen (DE); Armin Wernet, Rheinfelden (DE); Kaj Penkamp, Steinen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 1413 days.

(21) Appl. No.: 10/506,254

(22) PCT Filed: Mar. 11, 2003

(86) PCT No.: PCT/EP03/02497
§ 371 (c)(1),
(2), (4) Date: Oct. 10, 2013

(87) PCT Pub. No.: WO03/076882
PCT Pub. Date: Sep. 18, 2003

(65) Prior Publication Data
US 2017/0160121 A1    Jun. 8, 2017

(30) Foreign Application Priority Data
Mar. 11, 2002  (DE) .................. 102 10 504

(51) Int. Cl.
| G01F 23/00 | (2006.01) |
| G01F 23/24 | (2006.01) |
| G01F 23/04 | (2006.01) |
| G01F 23/26 | (2006.01) |
| G01F 25/00 | (2006.01) |

(52) U.S. Cl.
CPC .......... *G01F 23/0069* (2013.01); *G01F 23/04* (2013.01); *G01F 23/243* (2013.01); *G01F 23/244* (2013.01); *G01F 23/266* (2013.01); *G01F 25/0061* (2013.01)

(58) Field of Classification Search
None
See application file for complete search history.

(56) References Cited

U.S. PATENT DOCUMENTS

| 2,595,626 | A | * | 5/1952 | Bailey | ............... G01R 17/00 |
| | | | | | 323/365 |
| 2,639,411 | A | | 5/1953 | Schafer | |
| 3,397,715 | A | * | 8/1968 | Fathauer | ............ D06F 39/087 |
| | | | | | 137/387 |
| 3,916,213 | A | | 10/1975 | Luteran | |
| 4,255,706 | A | * | 3/1981 | Soojian | ............. G01R 15/005 |
| | | | | | 324/115 |

FOREIGN PATENT DOCUMENTS

| DE | 25 60 645 C2 | 6/1976 |
| DE | 33 08 074 A1 | 9/1984 |
| DE | 43 34 630 A1 | 4/1995 |
| DE | 195 48 219 A1 | 6/1997 |

* cited by examiner

*Primary Examiner* — James G Norman
(74) *Attorney, Agent, or Firm* — Bacon & Thomas, PLLC

(57) ABSTRACT

A field device electronics for a conductive, limit-level switch, with a conductive probe and a measuring circuit including a control/evaluation circuit. The measuring circuit, a measuring bridge circuit is present, with at least one coupling capacitor (C2) being present for the DC voltage separation of the probe from the measuring circuit, and with the at least one coupling capacitor (C2) being integrated into the measuring bridge circuit.

12 Claims, 2 Drawing Sheets

FIELD DEVICE ELECTRONICS FOR A CONDUCTIVE LIMIT-LEVEL SWITCH

FIELD OF THE INVENTION

The invention relates to a field device electronics for conductive limit-level switches.

BACKGROUND OF THE INVENTION

Conductive field devices for measuring limit level in liquids have been known for many years. In these field devices, the ohmic resistance, or conductance, between a conductive probe projecting into the container and the container wall, or between two electrodes of a probe, is measured. If a conductive medium forms an electrical connection between the conductive probe and the container wall, or between both electrodes of a probe, as the case may be, then the measured ohmic resistance is noticeably lowered.

The simplest possibility for measuring this ohmic resistance is to place a DC voltage on the probe circuit, and then measure the current flowing through the probe. This method, however, has two disadvantages: one is that the constantly flowing DC current can lead to corrosion of the conductive probe rods or the container wall, and the other is that the conductive probe rods and the container wall can form a galvanic element, and thus produce a current flow which is superimposed on the measuring current and, consequently, corrupts the measurement results. For these reasons, it is more sensible to measure with an alternating voltage, whereby a complete DC voltage separation of the measuring circuit from the probe circuit, and thus from the process, becomes possible by means of capacitors. Until now, circuits of this kind of have been implemented using comparatively complex analog technology.

SUMMARY OF THE INVENTION

An object of the invention is to provide a field device electronics for a conductive limit-level switch, with a simple construction and a good interference variable compensation.

This object is achieved according to the invention by the features of claim 1. The dependent claims concern advantageous embodiments and developments of the invention.

A main idea of the invention is that, in the measuring circuit, a measuring bridge circuit is present, with at least one coupling capacitor being present for the DC-voltage separation of the conductive probe from the measuring circuit, and with the at least one coupling capacitor being integrated into the bridge circuit.

In an especially advantageous embodiment of the invention, at least one additional capacitor is arranged in the measuring bridge circuit, with the at least one additional capacitor being arranged in the reference branch of the measuring bridge, and the at least one coupling capacitor being arranged in the probe branch of the measuring bridge.

A basic problem of such measuring bridge circuits is that not only the ratio between reference- and measuring-resistance affects the bridge voltage, but also the ratio of the utilized capacitors to one another. In the ideal case, the values of the coupling capacitor and the additional capacitor are exactly the same. In practice, however, there are deviations which result from tolerances and from the temperature behavior of the capacitors.

In an especially advantageous embodiment of the invention, a selective choosing of the point in time for the measurement compensates for the tolerance-related deviations between the two capacitors.

For the compensation, multiple measurements are acquired, in each case, approximately in the middle of a half-wave. From the acquired measurements, an average value is then determined. As measuring signal, only the difference between measurements in the upper and lower half-wave is then considered. This compensates for the tolerance-related deviations of the capacitors.

For the more precise determination of the point in time at which the measurement is taken, simulation runs with different deviations between the two capacitors are executed using a computer program for the dimensioned measuring circuit, and are then plotted. From the plots, a point can then be determined in each case within the upper, respectively lower, half-wave of the recorded simulation curves, at which point the simulation curves of the different deviations of the capacitors intersect. By a comparison with the measuring signal, the precise point in time (t-axis) of the intersection can be determined, and saved in a memory unit, which is part of the control/evaluation circuit. In the measuring process, the measurement voltage can then be sampled at precisely this point in time, or at multiple points in time which are grouped symmetrically to this exact point in time. Thus, for example, between 5 and 50 additional measurements can be taken. Through this procedure, the same result is always attained independently of the deviation of the capacitors. In this way, the compensation for the tolerances and temperature behavior of the utilized capacitors is relatively simple.

Additionally, this "double difference measurement"—the one between measuring- and reference branches, the other between upper and lower half-waves—compensates almost entirely for the influence of fluctuations in operating voltage.

To get by with fewer parts, the control/evaluation circuit of the measuring circuit is implemented with a microprocessor circuit, with the microprocessor circuit executing a generator function for producing the measuring signal, and/or a measurement function, and/or a range switching, and/or a comparator function, and/or a hysteresis function, and/or a production of an output signal.

As measuring signals, relatively low-frequency (circa 1 kHz), rectangular signals are used, which are simple to produce in the microcontroller, for example by frequency division of the clock signal.

To cover a wide measuring range (between 100Ω and 100 kΩ), measurements are taken with a bridge circuit, in which the reference resistances can be switched for adapting to the measuring range. As switching elements, semiconductor switches, preferably MOSFETs, are used.

By using a microprocessor circuit to generate the measuring signals, an analog oscillator is no longer necessary. Additionally, with a suitable embodiment of the control/evaluation circuit and a selective choosing of the point in time at which the measurement is taken, rectification of the alternating signals is no longer necessary.

By using a microprocessor circuit, it is possible, with slight alterations to the hardware, to issue different output signals, such as e.g. a PFM-output signal, a 4-20 mA-signal, a 0-10 V-signal, or a switching signal.

In addition, when measurement is not continuous, but, instead, separate rectangular-wave bursts are used (for example, bursts of 10 periods), separated by random generator pauses of different lengths of time, this increases the insensitivity to electromagnetic interferences, given that no constant interferences between measuring signal and disturbance signal can occur.

Furthermore, in these pauses, the microprocessor can be switched over to an energy-saving mode. In addition, because no current flows through the probe during the pauses, the current consumption can be lowered considerably, which is especially interesting for NAMUR applications.

The invention will now be explained in greater detail on the basis of the drawings, whose figures show as follows:

DESCRIPTION OF THE PREFERRED EMBODIMENT

Figure 1:
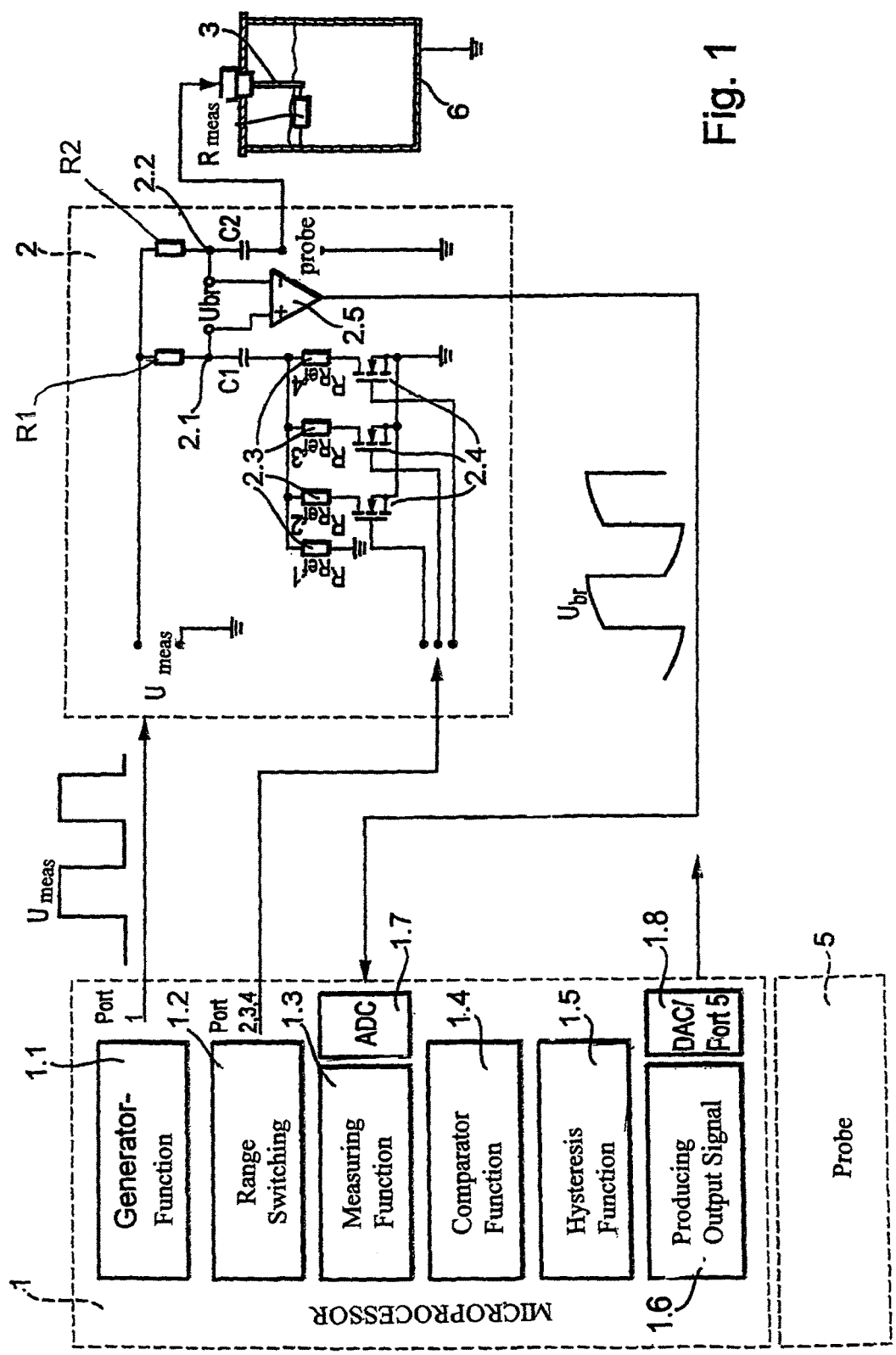
FIG. 1 a schematic illustration (block diagram) of the field device electronics.

As is apparent from FIG. 1, the field device electronics includes a control/evaluation microprocessor circuit 1, a measuring bridge circuit 2, a measuring, or conductive probe 3 in a container 4, and a memory unit 5. In the illustrated example of an embodiment, the microprocessor 1 assumes the following functions:

- the production of a rectangular signal $U_{meas}$ with the measuring frequency f1 (generator function 1.1), which is issued via Port 1 and fed to the bridge circuit directly or by way of an amplifier stage (not shown);
- a function for switching the desired measuring range (range switching 1.2), which, on the one hand, connects via digital ports (Port 2,3,4) the appropriate reference resistors 2.3 in the measuring bridge circuit 2, and on the other hand, sets switching thresholds and hystereses for the respective measuring ranges;
- an analog-digital conversion 1.7 of the bridge voltage $U_{br}$ measured via a differential amplifier 2.5;
- a measuring function 1.3, coupled with a comparator function 1.4, which conducts a comparison of the measured bridge voltage $U_{br}$ with predetermined threshold values, and forwards the result to a hysteresis function 1.5;
- production and issue of the desired output signal, 1.6, via a digital/analog convertor, or digital port, 1.8.

The measuring bridge circuit 2 includes: a reference branch 2.1, in which reference resistors 2.3 can be switched on, respectively off, using semiconductor switches 2.4, particularly MOSFETs, with the semiconductor switches 2.4 being driven on, or activated, by the microprocessor 1; a probe branch 2.2, into which the measuring probe 3 is switched in place of the reference resistors 2.3; and a difference amplifier 2.5, which measures the bridge voltage $U_{br}$ at the measuring bridge formed by the reference branch 2.1 and the probe branch 2.2. As is further apparent from the illustrated example of an embodiment, a coupling capacitor C2 is arranged in the probe branch, and an additional capacitor C1 is arranged in the reference branch. The measuring bridge circuit 2is supplied with a rectangular measuring voltage $U_{meas}$ from the microprocessor 1 by means of the generator function 1.1, and delivers the measured bridge voltage $U_{br}$ to the measuring function 1.3 in the microprocessor 1. In this illustrated example, two resistors R1 and R2 are arranged in the branches of the measuring bridge circuit between the supply of the measuring voltage $U_{meas}$ and the differential amplifier 2.5. measuring the bridge voltage $U_{br}$.

In the illustrated example of an embodiment, a rectangular measuring signal is used. However, it is also possible to use for the measuring any other signal forms with defined harmonic content.

Figure 2A:
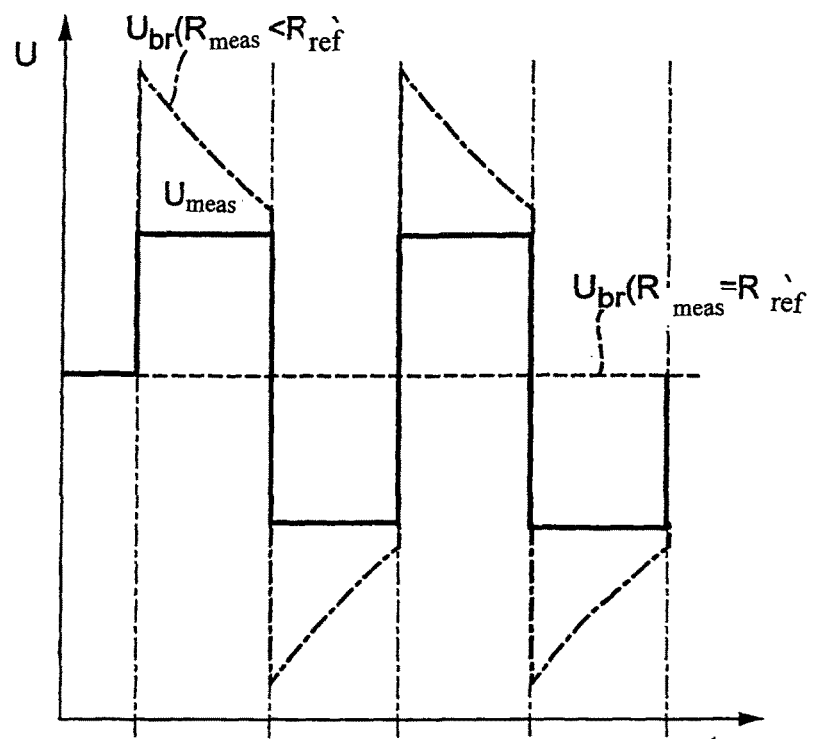
FIG. 2 a schematic illustration of the signal curves.

FIG. 2a shows plots of the voltages $U_{meas}$ and $U_{br}$ versus time for the case of the balanced measuring bridge (directly at the switching point; $R_{meas}=R_{ref}$) and for the case of being below the switching point ($R_{meas}<R_{ref}$). One can see that in the case of the balanced measuring bridge, the voltage difference between positive and negative half waves of $U_{br}$ disappears.

Figure 2B:
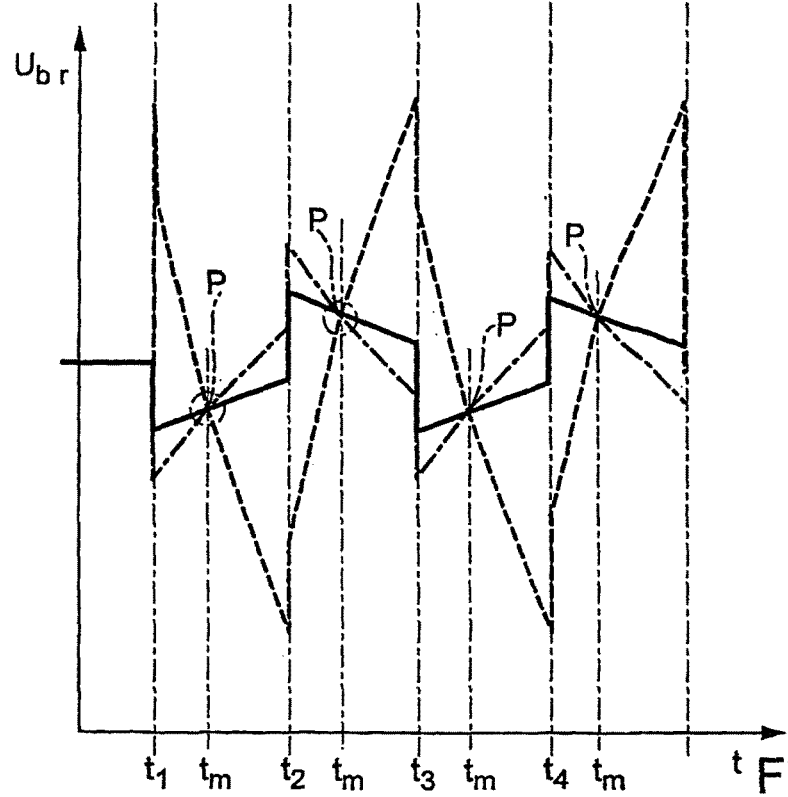

FIG. 2b shows the behavior of the voltage $U_{br}$ for different deviations of the capacitors C1, C2. At the point in time of the reversal of the measuring voltage $U_{meas}$ ($t_1$, $t_2$, $t_3$, . . . ), the jump in voltage is always of equal size, whereas the slope of the curves depends on the deviation of the capacitors. In each case, the shape of the curve is a section of the charge/discharge curve of the RC combination formed by the measuring bridge. In FIG. 2b, it can be clearly recognized that in each case the curves intersect in a point P within the upper, respectively lower half-wave. This point in time $t_m$ can be exactly calculated for a given dimensioning of the measuring bridge circuit by means of a simulation program (e.g. Pspice). If the voltage is sampled precisely at this point in time $t_m$, or, respectively, at multiple points in time (e.g. 20 points in time) grouped symmetrically within an interval about this point in time $t_m$, then the same result is always attained independently of the deviation of the capacitors, wherein the interval about the point in time $t_m$ should not exceed one tenth of the period length. In this way, the tolerances and temperature behaviors of the utilized capacitors, up to deviations of circa 10%, as they occur in practice, can be compensated.

The invention claimed is:

1. An apparatus embodied to measure the limit level of a fluid in a container, comprising:
   an electronic field device;
   at least one conductive probe projecting into the container; and
   a measuring circuit with a control/evaluation circuit, wherein:
   said control/evaluation circuit supplies said measuring circuit with a measurement voltage which is an alternating-current voltage;
   said measuring circuit includes a measuring bridge circuit, with a probe branch, a reference branch and a differential amplifier;
   said probe branch comprises said conductive probe and at least one coupling capacitor connected in series to said conductive probe in order to separate said conductive probe from said measuring circuit with respect to direct-current voltage;
   said reference branch comprises at least one reference resistor, and
   said differential amplifier measures the bridge voltage between said probe branch and said reference branch.

2. An apparatus as claimed in claim 1, wherein:
   at least one additional capacitor is arranged in said reference branch of said measuring bridge circuit.

3. An apparatus as claimed in claim 1, wherein:
   said measuring bridge circuit includes multiple, switchable reference resistors for expanding the measuring range.

4. An apparatus as claimed in claim 3, wherein:
   switching is accomplished using semiconductor switches, which are activated from said control/evaluation circuit.

5. An apparatus as claimed in claim 1, wherein:
   said control/evaluation circuit is implemented with a microprocessor circuit, said microprocessor circuit executes a generator function for the production of the measuring signal, and/or a measurement function for the evaluation of the measuring signal, and/or a range switching, and/or a comparator function, and/or a hysteresis function, and/or an output signal production.

6. An apparatus as claimed in claims 5, wherein:
during the pauses in measuring, the microprocessor is switched over to an energy-saving mode.

7. An apparatus for a conductive limit-level measurement, comprising:
an electronic field device;
a conductive probe;
and a measuring circuit with a control/evaluation circuit, wherein:
said control/evaluation circuit supplies said measuring circuit with a measurement voltage which is an alternating-current voltage;
said measuring circuit includes a measuring bridge circuit, with a probe branch, a reference branch and a differential amplifier;
said probe branch comprises said conductive probe in order to separate said conductive probe from said measuring circuit with respect with respect to direct-current voltage;
said reference branch comprises at least one reference resistor;
said differential amplifier measures the bridge voltage between said probe branch and said reference branch;
at least on additional capacitor is arranged in said reference branch of said measuring bridge circuit;
and tolerance-related deviations between said two capacitors are compensated by a selective choosing of the point in time for the measurement.

8. An apparatus as claimed in claim 7, further comprising:
a memory unit coupled with said control/evaluation circuit, in which the precise point in time (P) for the measurement is stored, wherein:
the precise point in time (P) for the measurement for a dimensioned measuring circuit is acquired before start-up using simulation runs.

9. An apparatus as claimed in claim 7, wherein:
said control/evaluation circuit conducts measurements at multiple points in time grouped about the precise point in time (P) for the measurement, and from these measurements determines an average value.

10. An apparatus as claimed in claim 9, wherein:
the multiple points in time are grouped symmetrically about the precise point in time (P) for the measurement.

11. An apparatus for a conductive limit-level measurement, comprising;
an electronic field device;
a conductive probe;
and a measuring circuit with a control/evaluation circuit, wherein:
said control/evaluation circuit supplies said measuring circuit with a measurement voltage which is alternating-current voltage;
said measuring circuit includes a measuring bridge circuit, with a probe branch, a reference branch and a differential amplifier;
said probe branch comprises said conductive probe and at least one coupling capacitor connected in series to said conductive probe in order to separate said conductive probe from said measuring circuit with respect to direct-current voltage;
said reference branch comprises at least one reference resistor;
said difference amplifier measures the bridge voltage between said probe branch and said reference branch;
said control/evaluation circuit is implemented with a microprocessor circuit, said microprocessor circuit executes a generator function for the production of the measuring signal, and/or a measurement function for the evaluation of the measuring signal, and/or a range switching, and/or a comparator function, and/or a hysteresis function, and/or an output signal production; and
the measurement is executed with separate rectangular-wave bursts, and an alterable pause period of time lies between two measurements.

12. An apparatus as claimed in claim 11, wherein:
the pause time can be adjusted by means of a random generator, which is part of said control/evaluation circuit.

* * * * *